US010994507B2

(12) United States Patent
Ferreto et al.

(10) Patent No.: US 10,994,507 B2
(45) Date of Patent: May 4, 2021

(54) ARRANGEMENT APPLIED TO AN ENVELOPE FOR RETREADING TYRES

(71) Applicant: BORRACHAS VIPAL S.A., Nova Prata (BR)

(72) Inventors: Mauri Roque Ferreto, Nova Prata (BR); Eleno Rogrigues Vieira, Nova Prata (BR); Ismael Borges Vieira, Nova Prata (BR); Leandro Gustavo Guedes, Nova Prata (BR); Paulo Rampon, Nova Prata (BR)

(73) Assignee: BORRACHAS VIP AL S.A., Nova Prata (BR)

( * ) Notice: Subject to any disclaimer, the term of this patent is extended or adjusted under 35 U.S.C. 154(b) by 415 days.

(21) Appl. No.: 15/738,071

(22) PCT Filed: Jun. 19, 2015

(86) PCT No.: PCT/BR2015/000092
§ 371 (c)(1),
(2) Date: May 11, 2018

(87) PCT Pub. No.: WO2016/201533
PCT Pub. Date: Dec. 22, 2016

(65) Prior Publication Data
US 2018/0264764 A1    Sep. 20, 2018

(51) Int. Cl.
*B29D 30/54*      (2006.01)
*B29C 35/18*      (2006.01)

(52) U.S. Cl.
CPC ............ *B29D 30/542* (2013.01); *B29C 35/18* (2013.01); *B29D 30/54* (2013.01)

(58) Field of Classification Search
CPC .............................. B29D 30/52; B29D 30/542; B29D 2030/582; B29D 2030/587;
(Continued)

(56) References Cited

U.S. PATENT DOCUMENTS 3,207,647 A * 9/1965 Schelkmann ........ B29D 30/542
156/421.2
3,837,385 A * 9/1974 Schelkmann ........ B29D 30/542
206/304.1
(Continued)

FOREIGN PATENT DOCUMENTS

BR      PI8406324      6/1986
BR      MU7901957-9    4/2001
(Continued)

OTHER PUBLICATIONS

ESpaceNet translation of JP-2009143132-A (Year: 2020).*
(Continued)

*Primary Examiner* — Katelyn B Whatley
*Assistant Examiner* — Alexander D Booth
(74) *Attorney, Agent, or Firm* — Liang & Hennessey LLP; Stanley D. Liang

(57) ABSTRACT

This invention provides an envelope configuration for retreading tires using a cold-retreading process. Envelopes formed by two parts are known in the prior art. However, the known sealing means between parts are not satisfactory, either due to sealing problems or due to decreasing the envelope useful life. In order to overcome these limitations, this invention provides an envelope (20) comprised of two parts (22, 24), in which an end region (224a) of a flap (224) of the first part (22) is covered by an end region (244a) of a flap (244) of the second part (24), or vice-versa, in order to form an overlapping joint, in which a free end of the flap (224) of the first part (22) has at least one differentiated cross section (224b) whose thickness is greater than that of the flap (224) of the first part (22), and in which the overlapping joint is covered by an elastic ring (26) that is wide enough to cover said differentiated cross section (224b).

4 Claims, 9 Drawing Sheets

(58) Field of Classification Search
CPC ............ B29D 2030/0659; B29D 30/54; B29D 2030/549; Y10S 156/909; B29C 35/18; B60B 30/00
USPC ............. 156/94, 95, 909; 425/17; 264/36.14
See application file for complete search history.

(56) References Cited

U.S. PATENT DOCUMENTS

| | | | |
|---|---|---|---|
| 4,500,375 A | | 2/1985 | Goldstein |
| 4,557,775 A | | 12/1985 | Berggren et al. |
| 4,588,460 A | * | 5/1986 | Magee .................. B29D 30/54 156/909 |
| 6,056,852 A | * | 5/2000 | Presti .................. B29D 30/542 156/394.1 |
| 2003/0096031 A1 | * | 5/2003 | Presti .................. B29D 30/542 425/17 |
| 2017/0165935 A1 | | 6/2017 | Roque Ferreto et al. |

FOREIGN PATENT DOCUMENTS

| | | | |
|---|---|---|---|
| BR | MU8502155 | | 2/2006 |
| EP | 0458436 A2 | | 11/1991 |
| JP | 2009143132 A | * | 7/2009 |
| WO | 2015176148 | | 11/2015 |

OTHER PUBLICATIONS

English Translation of PCT International Preliminary Report on Patentability for PCT/BR2015/000080 (published as WO 2015176148), dated Sep. 9, 2015.

* cited by examiner

ARRANGEMENT APPLIED TO AN ENVELOPE FOR RETREADING TYRES

FIELD OF THE INVENTION

The invention is in the technical field of retreading tires using a cold-retreading process, and more specifically an envelope configuration for retreading tires using a cold-retreading process.

BACKGROUND OF THE INVENTION

Retreading a tire consists of a process of bonding a new tread on top of a tire carcass whose original tread is worn out or damaged, thus reestablishing the tire's conditions for use.

In the process of cold retreading, a new pre-molded tread with a certain standard of grooves is positioned over a tire carcass that is ready to be retreaded. The assembly is taken to a pressurized and heated environment such as an autoclave, for a certain period of time. At the end of the cold-retreading process, the tread is bonded to the tire carcass. The cold-retreading process is widely used in retreading tires for heavy vehicles, particularly trucks and buses.

In the cold-retreading process, before taking the assembly formed by the carcass and the strip of tread to the pressurized and heated environment, this assembly must be covered with an envelope and a vacuum must be created internally in the envelope, creating an airtight environment.

A conventional envelope consists of a single-body membrane manufactured of flexible material, whose form is suitable for externally recovering the sidewalls of the carcass and the external surface of the tread. The envelope also has an air valve. The process of recovering the carcass and the tread with the envelope, also known as enveloping, is extremely difficult since the conventional envelope must be stretched from its central hole until the carcass and tread assembly can be placed inside the envelope. This enveloping process is usually done with the help of a machine called envelope spreader, which contains a set of arms used to stretch the conventional envelope.

Once the conventional envelope is applied, it must be closed next to the tire carcass to obtain an airtight environment inside the envelope. To do this, an internal envelope may be used, installed inside the carcass so that the internal envelope covers the entire internal surface of the carcass, surrounds the beads of the carcass, and extends over part of the external surface on each side of the carcass, where a seal is created with each end of the conventional envelope. Alternatively, a rim may be used instead of the internal envelope to close the conventional envelope next to the carcass. In this case, the ends of the envelope, close to the carcass bead, are pressed against the outside surface of the rim, forming sealed joints. Once the conventional envelope has been closed, either with the help of the internal envelope or rim, an air pump is connected to the air valve of the conventional envelope, to form a vacuum in its internal environment. The assembly is now ready to be taken to the pressurized and heated environment, such as an autoclave.

As described previously, to envelop the carcass and tread using a conventional envelope, a large stretching of the envelope is required, regardless of subsequent closure with an internal envelope or rim. To make this stretching possible, the conventional envelope is usually quite thin. This factor, in addition to the fatigue caused by repeated enveloping cycles, frequently causes tears in the conventional envelope, limiting its useful life.

With the intention of increasing the useful life of an envelope, document BRPI8406324-6 proposes an envelope formed by two parts, the first part having a form that is able to externally cover a first side of the carcass and a half portion of the tread, and the second part having a form that is able to externally cover a second side of the carcass and the other half portion of the tread, and in the central area of the top of the tread an end region of the first part is turned to the outside and an end region of the second part is turned to the outside, said end regions being positioned face to face and held together by tightening a pair of retaining rings in order to form a sealed joint between the parts that is able to maintain vacuum inside the envelope.

With use of the two-part envelope proposed in BRPI8406324-6, the need to heavily stretch the envelope in order to envelop the carcass and tread assembly is eliminated, such that it was expected that the proposed envelope would tend to have a longer useful life. In addition, with this envelope configuration the use of the envelope spreader is eliminated. However, the configuration of the seal between the parts of the envelope proposed in BRPI8406324-6 is not satisfactory, as the tightening done using the pair of retaining rings against the face to face end regions, at an intensity that is sufficient for appropriate sealing, damages said end regions, causing them to break after just a few enveloping cycles. In addition, due to the complexity of the pair of retention rings proposed in BRPI8406324-6, their use represents an additional cost to the retreading process.

Alternatively, BRMU7901957-9 proposes another envelope configuration formed by two parts, so that to seal the parts in the central area of the top of the tire tread, the first part has an end region covered by an end region of the second part in order to form an overlapping joint. Despite this configuration eliminating the use of the pair of retaining rings, the sealing configuration between the parts of the envelope is not satisfactory, since air leaks occur into the envelope.

Note that as described previously, after enveloping and formation of the vacuum, the carcass and tread is taken to a pressurized and heated environment, such as an autoclave, for a certain period of time. In this environment, the envelope is pressed against the tread due to the pressure existing outside the envelope so that the tread and the carcass are forced against each other. Heat is applied simultaneously in order to vulcanize the tread to the carcass.

It is important for the envelope to be well sealed in relation to the carcass and the tread in order to prevent air from entering into the envelope. The presence of air inside the envelope during the curing process might interfere with the quality of attachment between the carcass and the tread, or it could result in the deformation and/or improper seating of the tread, compromising subsequent use of the retreaded tire. Thus, due to the deficiency in sealing the parts of the envelope proposed in BRMU7901957-9, the problems listed above are present in the retreading that is done using this envelope configuration.

SUMMARY OF THE INVENTION

In light of the foregoing, an objective of the invention is to provide an envelope configuration for retreading tires that overcomes or ameliorates the limitations present in the state-of-the-technique. More specifically, an objective of the invention is to provide an envelope configuration that improves enveloping of the carcass and the tread assembly, without the need for large stretching of the envelope, and without the need to use the envelope spreader.

Furthermore, another objective of the invention is to provide an envelope that has an improved useful life, with low construction complexity and low manufacturing costs.

And overall, an objective of the invention is to provide an envelope that provides excellent sealing of the carcass and the tread assembly in order to prevent any air entry inside the envelope after enveloping and formation of the vacuum.

To attain these objectives, the envelope for tire retreading is comprised of two parts, the first part having a sidewall from which extends a flap, the sidewall having a form that is able to cover at least part of an external portion of a first side of the carcass and a first shoulder of the tread, and the flap having a form that is able to cover at least part of the top of the tread; and the second part comprises a sidewall from which extends a flap, the sidewall having a form that is able to cover at least part of an external portion of a second side of the carcass and the second shoulder of the tread, and the flap having a form that is able to cover a remaining part of the top of the tread; an end region of the flap of the first part is covered by an end region of the flap of the second part, or vice-versa, in order to form an overlapping joint; and at least one of the envelope parts having an air valve.

According to the present invention, a free end of the flap of the first part has at least one differentiated cross section whose thickness is greater than that of the flap of the first part; and the overlapping joint is covered by an elastic ring that is wide enough to cover the differentiated cross section.

According to the present invention, the elastic ring presses the end region of the second part against the end region of the first part, increasing the sealing effect between the parts of the envelope.

At the same time, the presence of the differentiated cross section in the free end of the part of the envelope that is covered by the other part of the envelope increases the sealing effect between the parts that is caused by the suction of air through the air valve.

Thus, advantageously, there is an envelope that provides an excellent seal for the carcass and the tread assembly in order to prevent any entry of air inside the envelope after enveloping and formation of the vacuum.

BRIEF DESCRIPTION OF THE DRAWINGS

The invention will be understood better with the detailed description that follows, which will be more easily interpreted with the help of the following figures.

DETAILED DESCRIPTION

Figure 1:
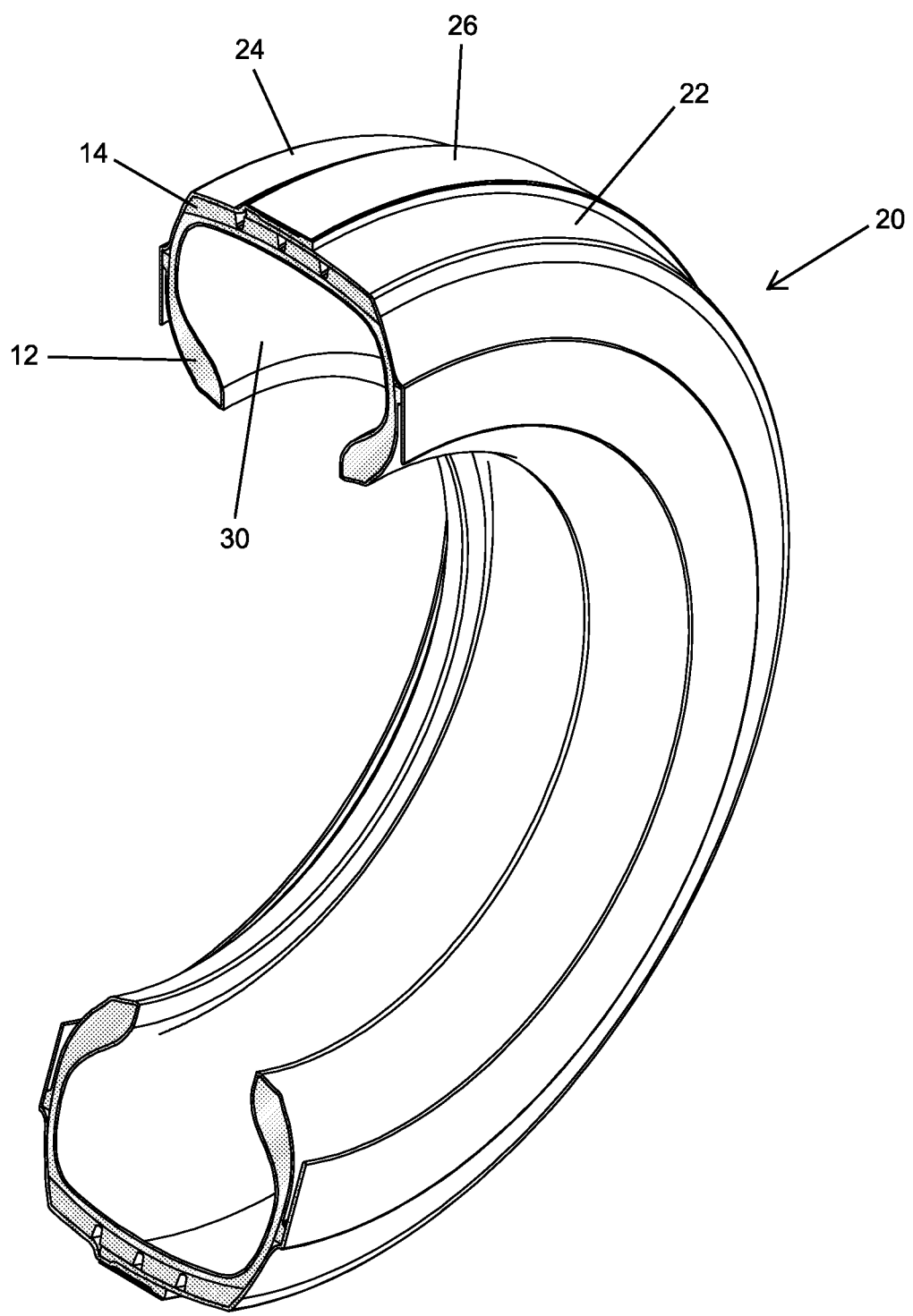
FIG. 1 shows a cross-section perspective view of a tire carcass and tread assembly covered by an envelope, according to the invention, closed with the help of an internal envelope.

In the process of cold-retreading a tire, a tire carcass (12) that is ready to be retreaded is covered by a new pre-molded tread (14) having a top (145) with a certain standard of grooves (141). The carcass (12) is formed by a pair of sidewalls (121, 122), each sidewall (121, 122) starting from an area called bead (124), until they are joined together by a central portion (123). The tread (14) is delimited by a pair of shoulders (142, 144) and is positioned on the external surface of the central portion (123) of the carcass (12), where the shoulders (142, 144) define the side extremities of the tread (14), which are placed in accordance with the respective sidewall (121, 122) of the carcass (12). For preliminary connection of the tread (14) onto the carcass (12), an appropriate means is used, such as, for example, cushion gum or orbicushion rubber, both known in the state-of-the-art.

The carcass (12) and the tread (14) must be taken to a pressurized and heated environment such as an autoclave for a determined period of time. At the end of the cold-retreading process, the new tread (14) is bonded to the tire carcass (12), reestablishing conditions of use for the tire.

However, before taking the assembly formed by the carcass (12) and the tread (14) to the pressurized and heated environment, it is necessary to cover the assembly with an envelope and to create an internal vacuum inside the envelope, obtaining an airtight environment.

An embodiment of the invention includes an envelope configuration (20) for retreading tires, the envelope (20) being comprised of two parts (22, 24), the first part (22) comprising a sidewall (222) from which extends a flap (224), the sidewall (222) having a form that is able to cover at least part of an external portion of the first side (121) of the carcass (12) and the first shoulder (142) of the tread (14), and the flap (224) having a form that is able to cover at least part of the top (145) of the tread (14); and the second part (24) comprising a sidewall (242) from which extends a flap (244), the sidewall (242) having a form that is able to cover at least part of an external portion of the second sidewall (122) of the carcass (12) and the second shoulder (144) of the tread (14), and the flap (244) having a form that is able to cover a remaining part of the top (145) of the tread (14); an end region (224a) of the flap (224) of the first part (22) is covered by an end region (244a) of the flap (244) of the second part (24), or vice-versa, in order to form an overlapping joint; and at least one of the two parts (22, 24) of the envelope (20) having an air valve (28).

According to an embodiment of the invention, a free end of the flap (224) of the first part (22) has at least one differentiated cross section (224b) whose thickness is greater than that of the flap (224) of the first part (22); and the overlapping joint is covered by an elastic ring (26) that is wide enough to cover the differentiated cross section (224b). Each part (22, 24) of the envelope (20), as well as the elastic ring (26), is made of flexible airtight material such as rubber.

According to the present invention, the elastic ring (26) presses the end region (244a) of the second part (24) against the end region (224a) of the first part (22), increasing the sealing effect between the parts (22, 24) of the envelope (20).

At the same time, the presence of the differentiated cross section (224b) in the free end of the first part (22), which is covered by the second part (24), increases the sealing effect between the two parts (22, 24) of the envelope (20), caused by air suction through the air valve (28).

Thus, advantageously, there is an envelope (20) that provides excellent sealing for the carcass (12) and tread (14) assembly, in order to prevent any entry of air inside the envelope (20) after enveloping and vacuum formation.

Figure 2:
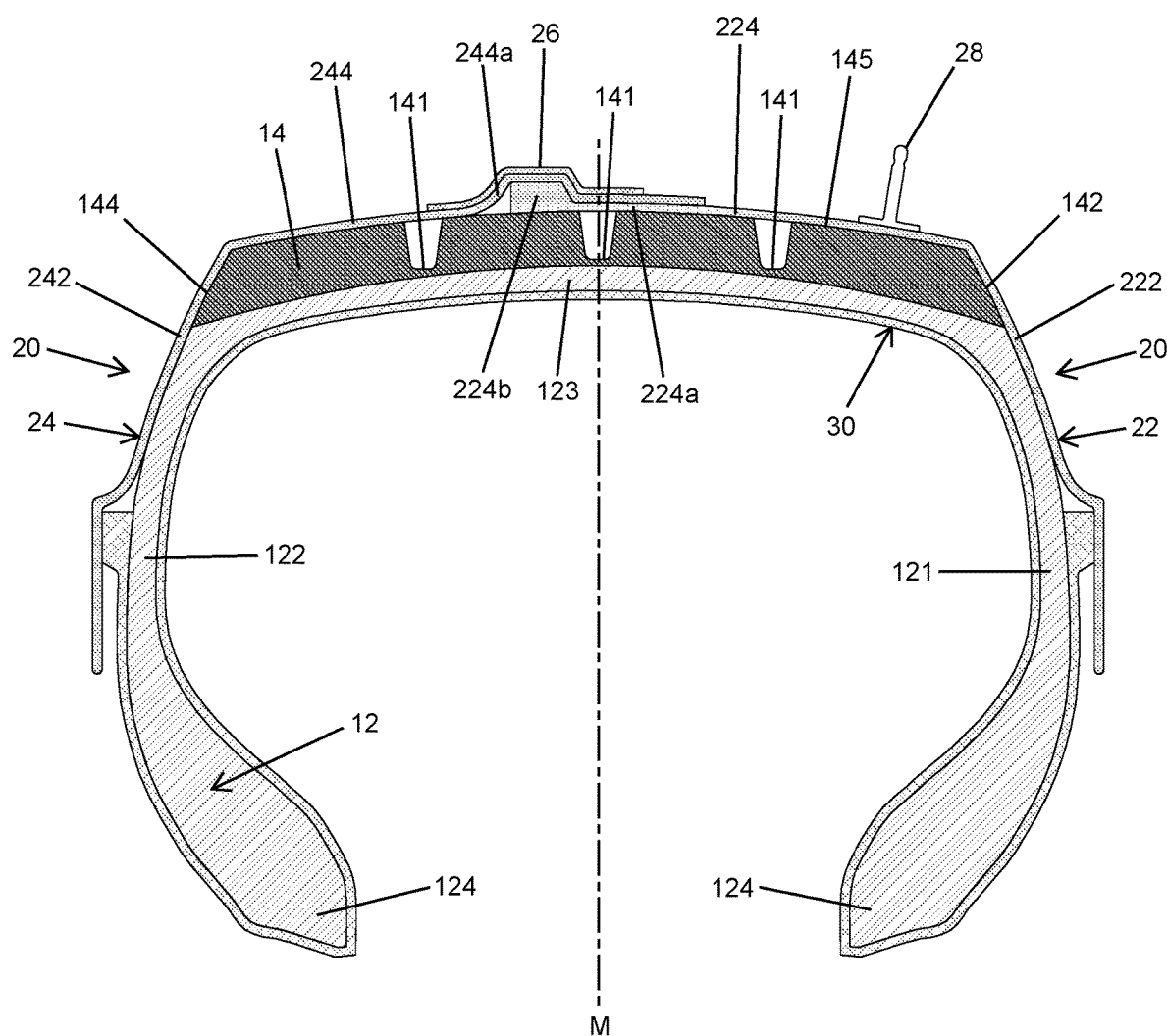
FIG. 2 shows a cross-section view of a tire carcass and tread assembly covered by an envelope, according to a first embodiment of the invention and with uniform thickness, said envelope being closed with the help of an internal envelope.

Note that in all of the illustrated embodiments, the free end of the flap (224) of the first part (22) has a differentiated cross section (224b) whose thickness is greater than that of the flap (224) of the first part (22), and the overlapping joint is covered by an elastic ring (26) that is wide enough to cover the differentiated cross section (224b). According to a first embodiment of the envelope (20), as shown in FIG. 2, the free end of the flap (244) of the second part (24) has a thickness that is identical to the rest of that flap (244) of the second part (24).

However, according to a second embodiment of the envelope (20), as shown in FIGS. 3 to 5 and 7 to 9, preferably the free end of the flap (244) of the second part (24) has at least one differentiated cross section (244b) whose thickness is greater than the thickness of the flap (244) of the second part (24), and the differentiated cross section (244b) of the second part (24) is also covered by the elastic ring (26).

Preferably the flap (224) of the first part (22) extends to a position posterior to the middle plane (M) of the tread (14) and anterior to the second shoulder (144) of the tread (14). Preferably the flap (244) of the second part (24) extends to a position posterior to the middle plane (M) of the tread (14) and anterior to the first shoulder (142) of the tread (14). Note that preferably the envelope parts (22, 24) are manufactured in the same mold so that they are identical to each other. Thus, in the event that one of the envelope parts (22, 24) is damaged, only the damaged part is replaced.

The envelope (20) must also be closed next to the carcass (12) to form a vacuum inside the envelope (20). To do this, for example, as shown in FIGS. 1 to 5, an internal envelope (30) can be used and installed inside the carcass (12) so that the internal envelope (30) covers the entire internal surface of the carcass (12), surrounds the beads (124) of the carcass (12) and extends over part of the external surface of each side (121, 122) of the carcass (12). In this external area of each side (121, 122), an end region of the sidewall (222, 242) of the respective part (22, 24) is placed over a respective end region of the internal envelope (30), in order to form a sealed joint when the vacuum is formed.

Figure 6:
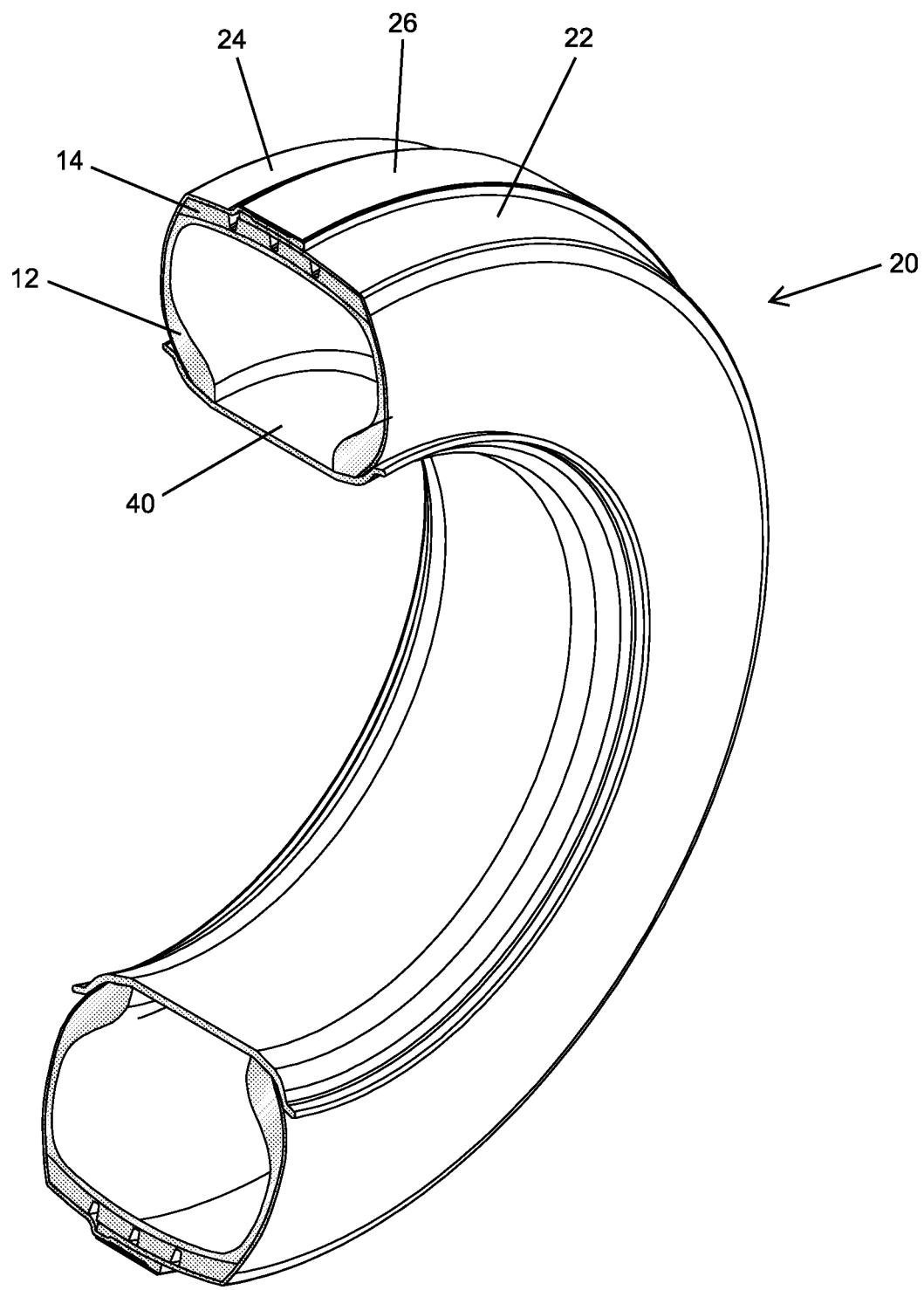
FIG. 6 shows a cross-section perspective view of a tire carcass and tread assembly covered by an envelope, according to the invention, closed with the help of a rim.
Figure 7:
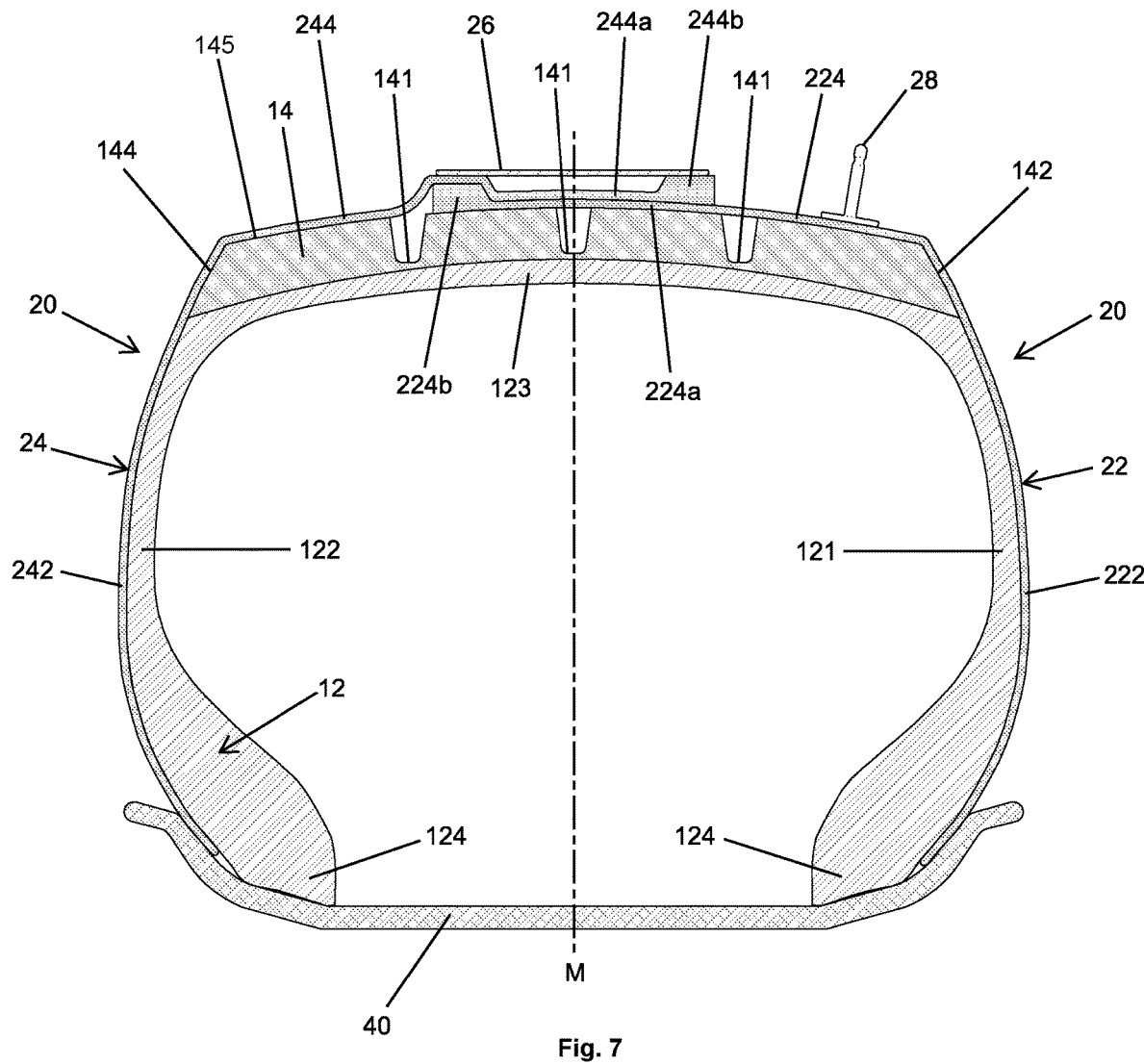
FIG. 7 shows a cross-section view of a tire carcass and tread assembly covered by an envelope, according to a second embodiment of the invention, and with uniform thickness, said envelope being closed with the aid of a rim.
Figure 8:
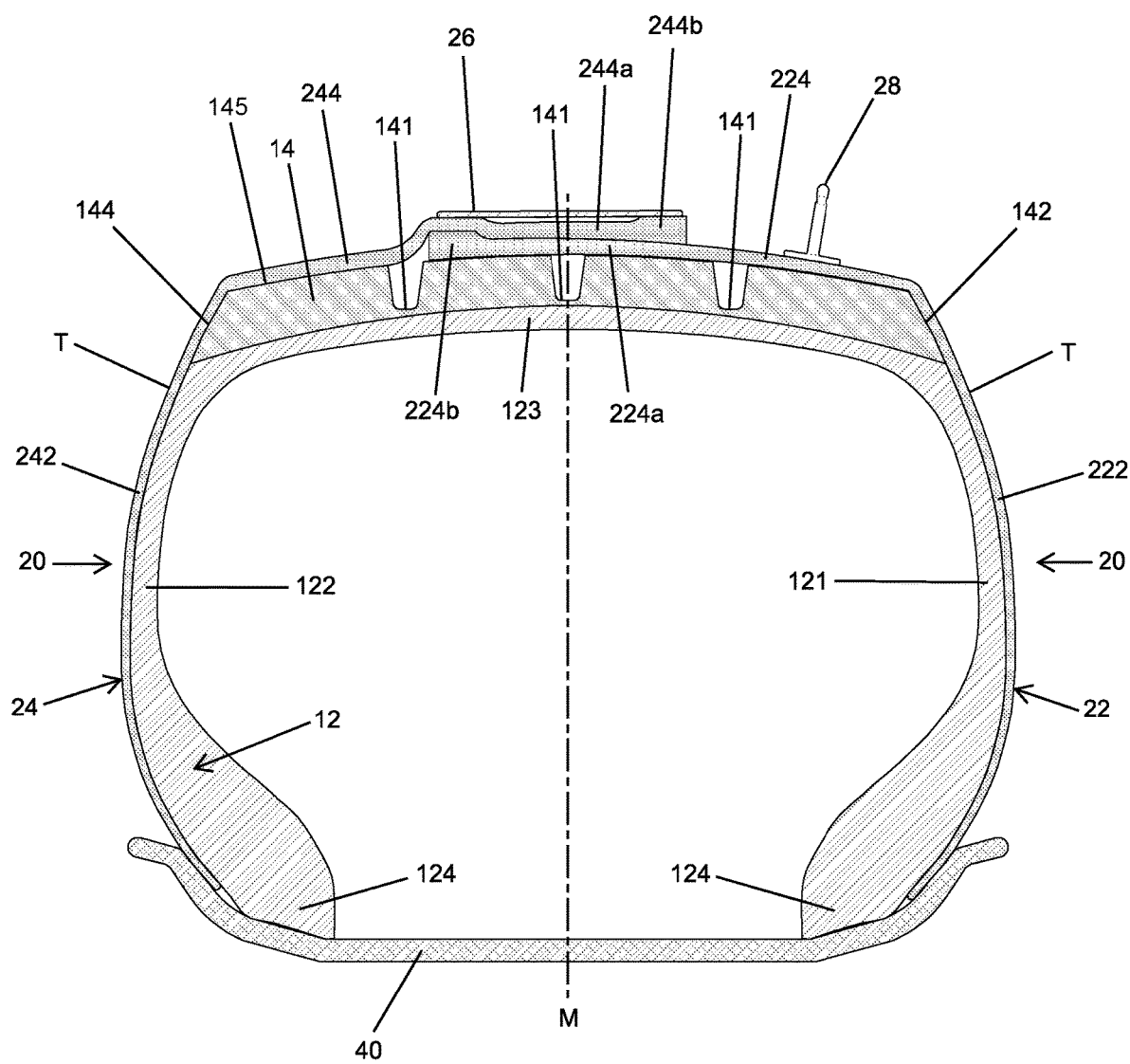
FIG. 8 shows a cross-section view of a tire carcass and tread assembly covered by an envelope, according to the second embodiment of the invention, and with variable thickness, said envelope being closed with the aid of a rim.

Alternatively, a rim (40) may be used instead of the internal envelope (30) to close the envelope (20) next to the carcass (12), as shown in FIGS. 6 to 8. In this case, both the sidewall (222) of the first part (22) as well as the sidewall (242) of the second part (24) extend close to the bead (124) of the respective side (121, 122) of the carcass (12) and are pressed against the outside surface of the rim (40), forming sealed joints.

Figure 9:
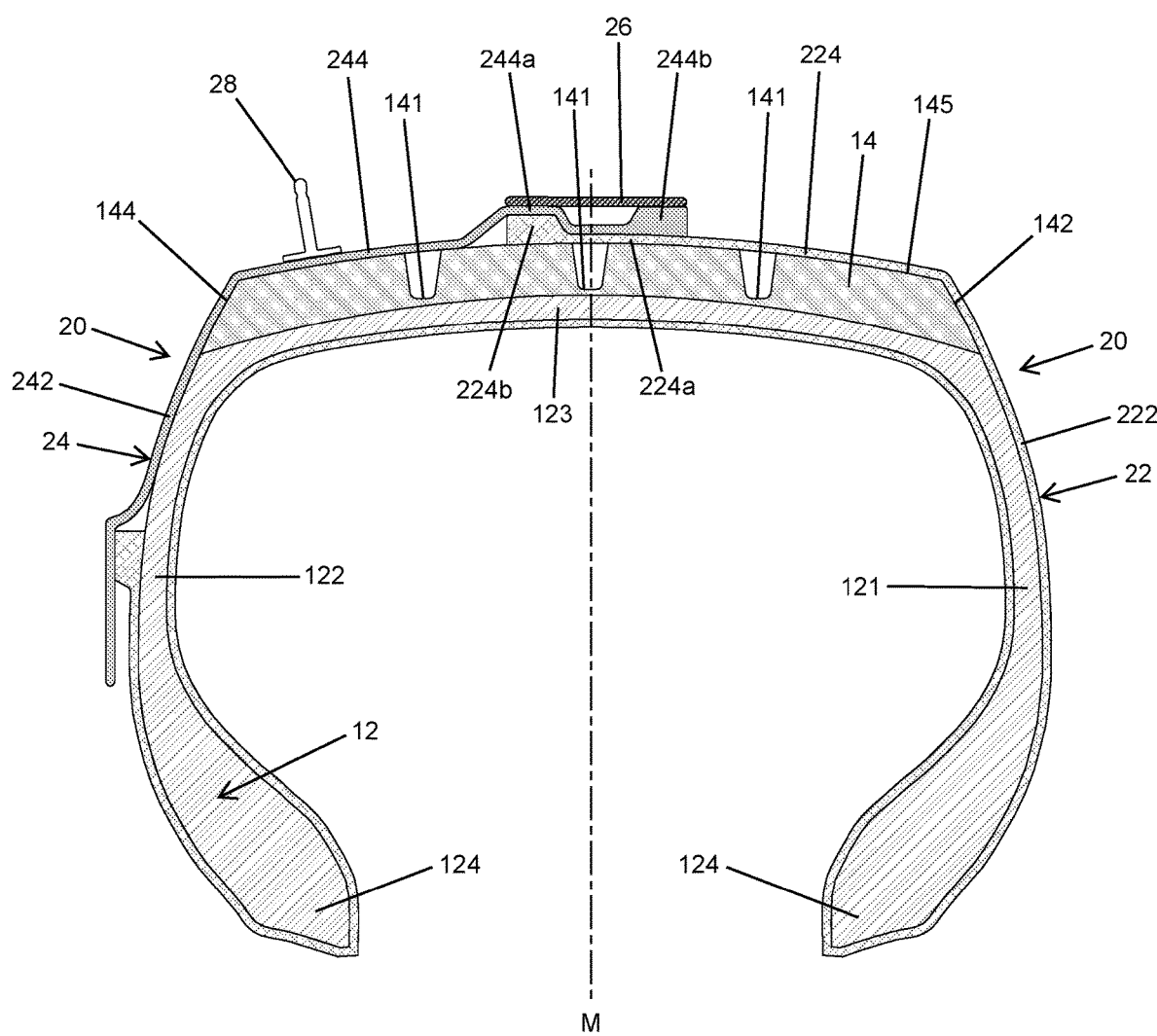
FIG. 9 shows a cross-section view of a tire carcass and tread assembly covered by an envelope, according to the second embodiment of the invention and with uniform thickness, said envelope being closed by a continuity of the sidewall of the first part.

Alternatively, instead of using an internal envelope (30) or rim (40) to close the envelope (20) next to the carcass (12), as shown in FIG. 9, the sidewall (222) of the first part (22) extends and surrounds the bead region (124) of the first side (121) of the carcass (12), it covers the entire internal surface of the carcass (12), surrounds the bead region (124) of the second side (122) and advances over part of the outside surface of the second side (122) of the carcass (12). In this outside area of the second side (122), an end region of the sidewall (242) of the second part (24) is placed over an end region of the extension of the first part (22) in order to form a sealed joint when the vacuum is formed.

Once the envelope is closed (20) and the vacuum is formed inside the envelope (20) by air suction through the air valve (28), the carcass (12) and tread (14) assembly is ready to be taken to a pressurized and heated environment, such as an autoclave.

Figure 3:
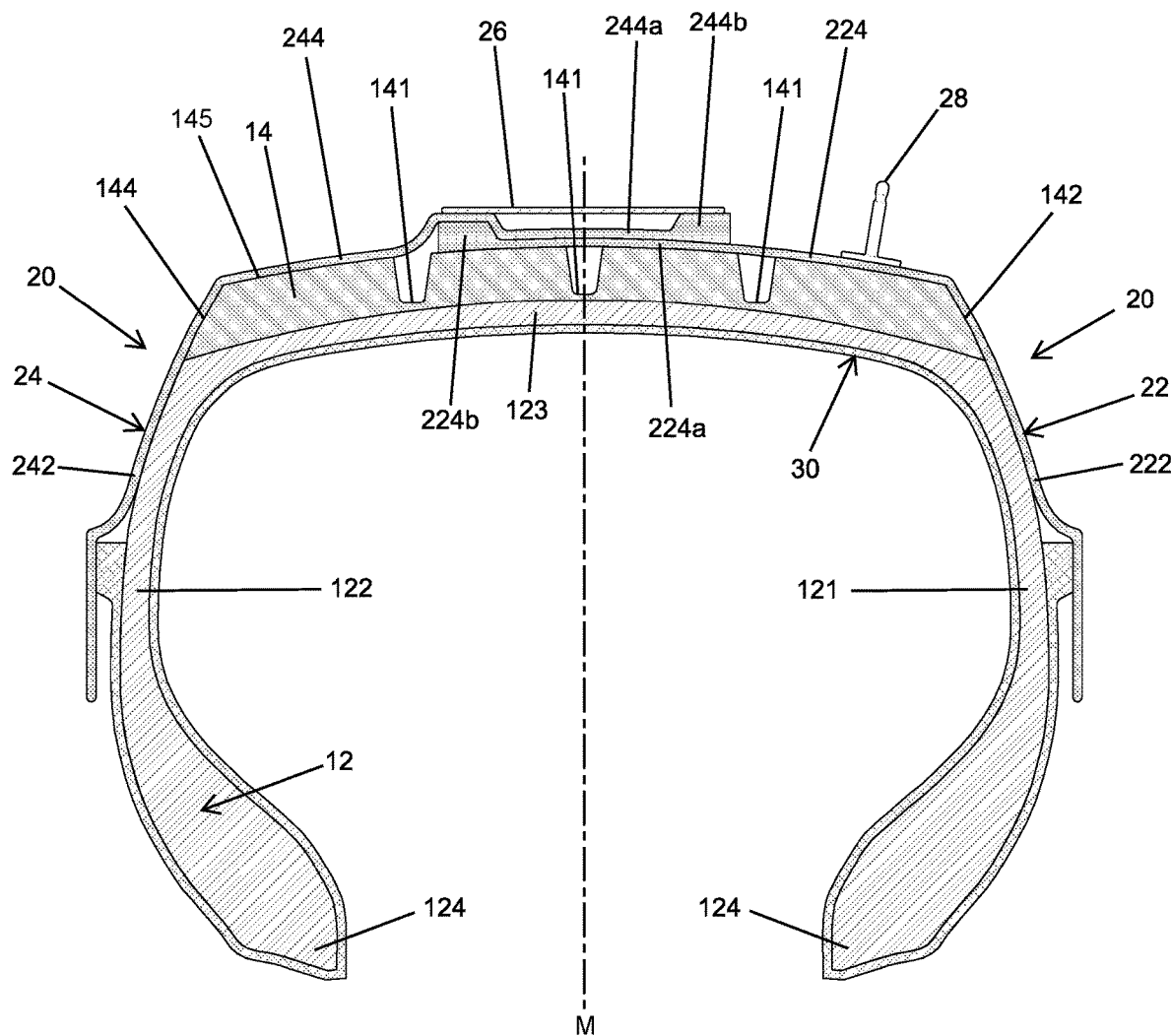
FIG. 3 shows a cross-section view of a tire carcass and tread assembly covered by an envelope, according to a second embodiment of the invention and with uniform thickness, said envelope being closed with the help of an internal envelope.
Figure 4:
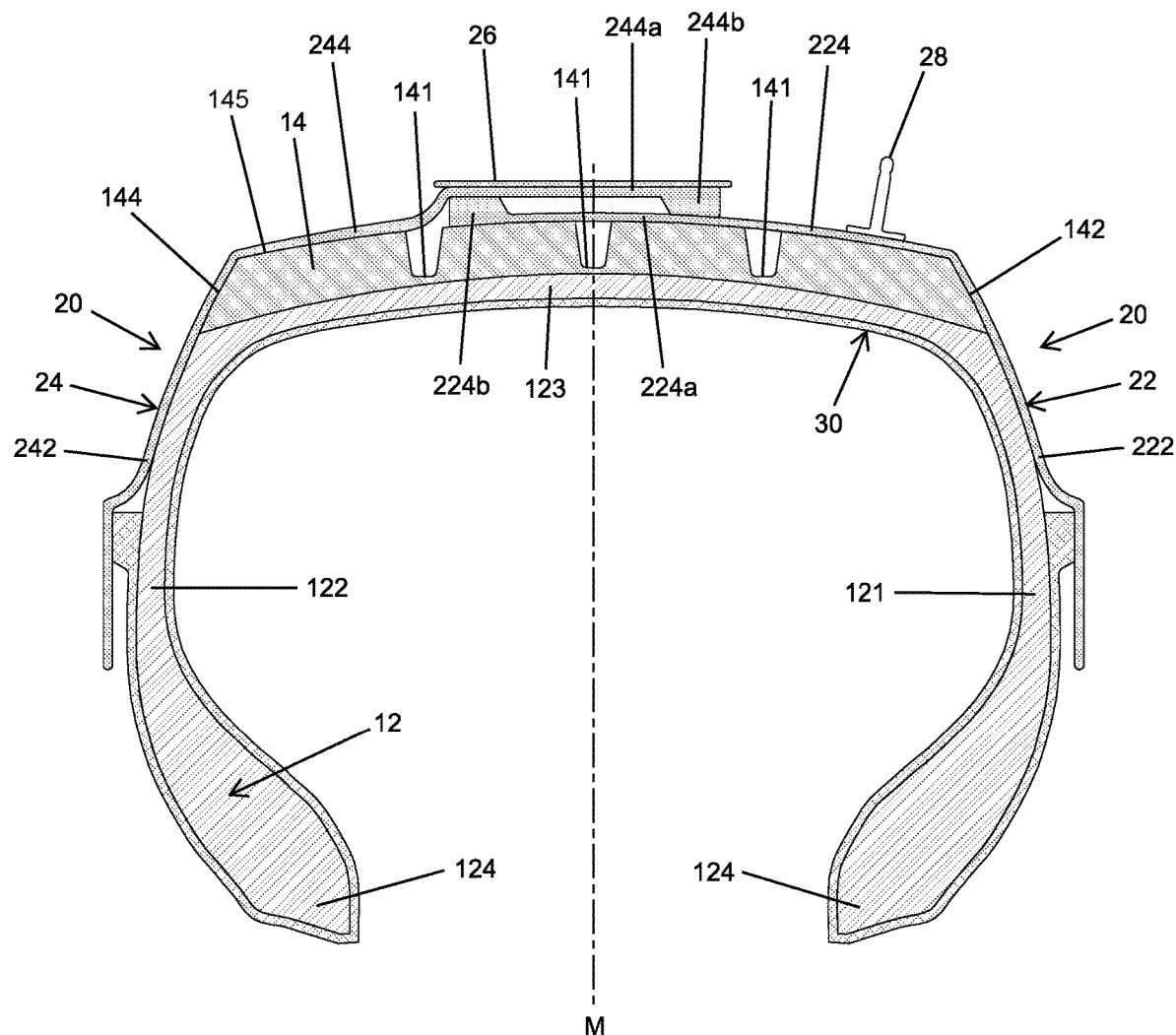
FIG. 4 shows a cross-section view of a tire carcass and tread assembly covered by an envelope, according to a second embodiment of the invention, with uniform thickness, and with the second part installed in the reverse manner, said envelope being closed with the help of an internal envelope.

Also, as shown in FIGS. 3, 4 and 7, the first part (22) is uniform in thickness, with the exception of its differentiated cross section (224b), and the second part (24) is uniform in thickness, with the exception of its differentiated cross section (244b), and the thickness of the first part (22) is identical to the thickness of the second part (24). Preferably the thickness of the first part (22) and the thickness of the second part (24) is from 2 to 3.5 mm.

Figure 5:
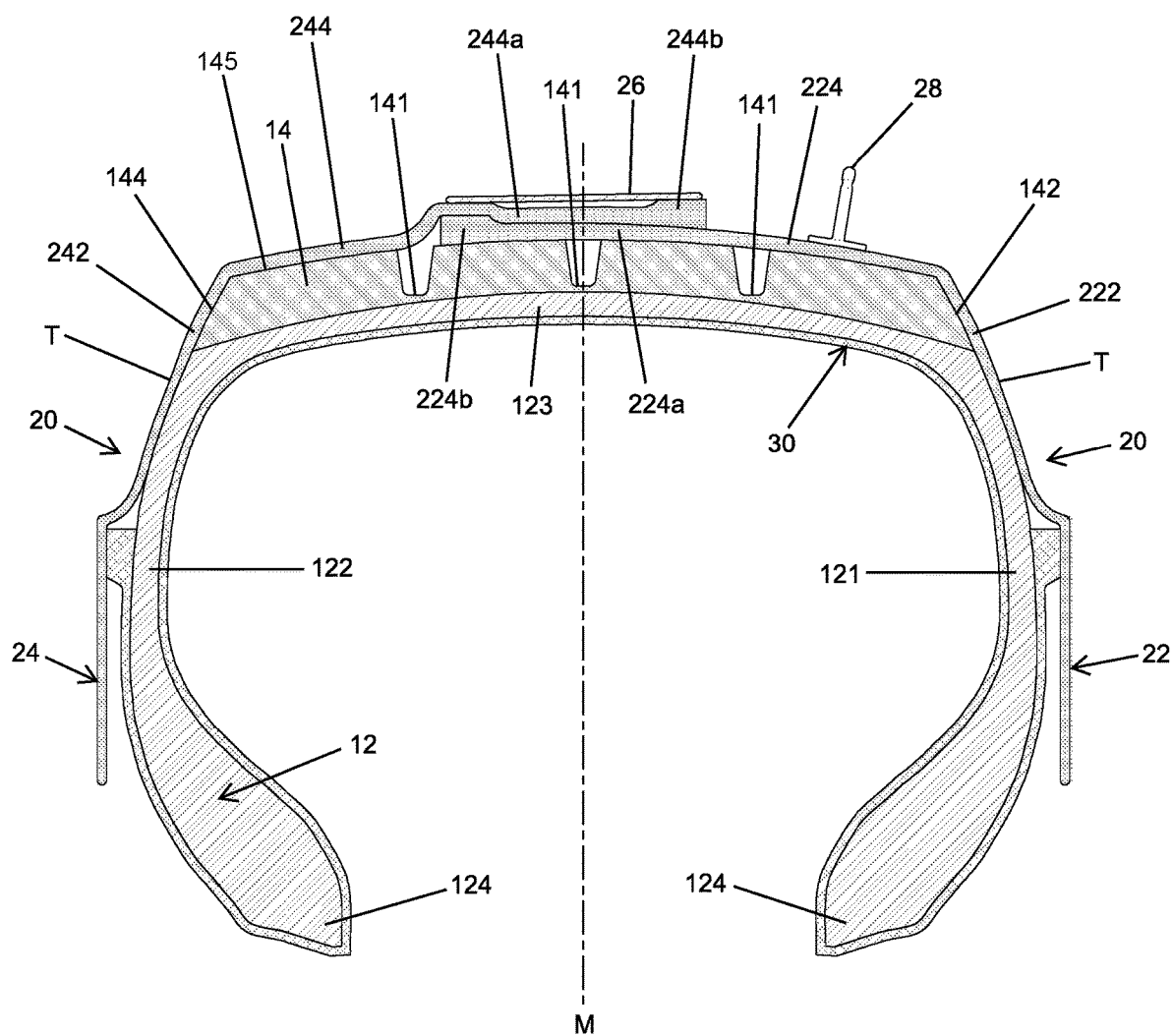
FIG. 5 shows a cross-section view of a tire carcass and tread assembly covered by an envelope, according to an embodiment of the invention, with variable thickness, said envelope being closed with the help of an internal envelope.

Alternatively, as shown in FIGS. 5 and 8, the thickness of each part (22, 24) is greater from a transition point (T) to a point immediately prior to the differentiated cross section (224b, 244b) present on the respective flap (224, 244), where each transition point (T) is located on the sidewall (222, 242) of the respective part (22, 24) in a position that is close to the respective shoulder (142, 144) of the tread (14). Preferably, each transition point (T) is located in a position that is above the half of the height of the respective side (121, 122) of the carcass (12) and below the top (145) of the tread (14).

The configuration in which each part (22, 24) of the envelope (20) has a variable thickness is preferable in relation to the configuration in which each part (22, 24) of the envelope (20) has uniform thickness, since the fact that a portion of the sidewall (222, 242) posterior to the transition point (T) and the flap (224, 244) of one part (22, 24) are thicker allows said part (22, 24) of the envelope (20) to assume a more structured form that is more similar to the form of the carcass (12) and tread (14) assembly. Thus, advantageously, this makes easier handling and installing the parts (22, 24) of the envelope (20) on the carcass (12) and the tread (14) assembly.

Additionally, the fact of the flap (224, 244) of one part (22, 24) is thicker prevents said flap (224, 244) from being stretched inside the grooves (141) of the tread (14), whether this is due to formation of the vacuum inside the envelope (20), or whether it is due to application of pressure outside the envelope (20) during the process in the autoclave. Thus, advantageously, deformations in the flaps (224, 244) of the parts (22, 24) of the envelope (20) are prevented, and consequently fatigue stresses that would be caused by this repeated deformation throughout the various cycles of using the same envelope (20) are prevented, contributing to increasing its useful life.

Therefore, the fact that the portion of the sidewall (222, 242) prior to the transition point (T) is of smaller thickness has the advantage of saving material during manufacturing of the parts (22, 24) of the envelope (20).

Preferably the thickness of the portion of the sidewall (222, 242) prior to the transition point (T) is from 2 to 3.5 mm. Preferably the thickness of the portion of the sidewall (222, 242) posterior to the transition point (T) and the thickness of the flap (224, 244) to a point immediately prior to the differentiated cross section (224b, 244b) is higher in value than that of the thickness of the portion of the sidewall (224, 244) prior to the transition point (T). This value is preferably not greater than 6 mm.

For example, if one part (22, 24) of the envelope (20) was manufactured with a portion of the sidewall (224, 244) prior to the transition point (T) with a thickness of 3 mm, the thickness of the sidewall (224, 244) from the transition point (T) and the thickness of the flap (224, 244) will have a value that is greater than 3 mm. This thickness increasing may be gradual, as shown in FIGS. 5 and 8, for example, starting with 3.1 mm at one point immediately posterior the transition point (T) and terminating at 5 mm at a point immediately prior to the differentiated transversal section (224b, 244b). Or this thickness increasing may be abrupt, according to a not illustrated embodiment, for example going from 3 mm to 5 mm at one point immediately posterior to the transition point (T) and ending at 5 mm at a point immediately prior to the differentiated cross section (224b, 244b).

In all represented embodiments of the envelope (20), as shown in the Figures, the differentiated cross section (224b, 244b) on the free end of the flap (224, 244) of each part (22, 24) is rectangular in shape. However, each differentiated cross section (224b, 244b) may have another shape, such as, for example, a circular shape. The thickness of each differentiated cross section (224b, 244b) has a value greater than the thickness of the flap (224, 244), at a point immediately prior to said differentiated cross section (224b, 244b), preferably between 8 and 12 mm. Furthermore, the differentiated cross section of the part that is above, identified in the Figures as the differentiated cross section (244b) of the second part (24), may have the increased thickness turned to the exterior of the carcass (12) and tread (14) assembly, as shown in FIGS. 3, 5, 7, 8 and 9, or it may have the increased thickness turned towards the inside of the carcass (12) and tread (14) assembly, as shown in FIG. 4.

Thus, in the case of enveloping shown in FIG. 4, the second part (24) was positioned inversely in relation to the manner of positioning the second part (24) shown in FIGS. 3, 5, 7, 8 and 9.

The thickness of the elastic ring (26) is preferably between 3 and 5 mm.

We claim:

1. An envelope for tire retreading in which a tire carcass is covered by a pre-molded tread having a top with a certain standard of grooves, the envelope being comprised of two parts, the first part having a sidewall from which extends a flap, the sidewall having a form that is able to cover at least part of an external portion of a first side of the carcass and a first shoulder of the tread, and the flap having a form that is able to cover at least part of the top of the tread; and the second part having a sidewall from which extends a flap, the sidewall having a form able to cover at least part of an external portion of a second side of the carcass and a second shoulder of the tread, and the flap having a form that is able to cover a remaining part of the top of the tread; wherein an end region of the flap of the first part is covered by an end region of the flap of the second part in order to form an overlapping joint; and at least one of the parts of the envelope having an air valve, wherein a free end of the flap of the first part has at least one differentiated cross section whose thickness is greater than the thickness of a remainder of the flap of the first part, wherein the free end and the remainder of the flap of the first part have an inner surface able to be entirely in contact with the at least part of the top of the tread, wherein a free end of the flap of the second part has at least one differentiated cross section whose thickness is greater than the thickness of a remainder of the flap of the second part, wherein the second part is identical in shape and size to the first part, and wherein the overlapping joint is covered by an elastic ring that is wide enough to cover the differentiated cross section of the first part.

2. The envelope of claim 1, wherein the differentiated cross section of the second part is also covered by the elastic ring.

3. The envelope of claim 2, wherein the first part has an uniform thickness, with the exception of its differentiated cross section, and wherein the second part has an uniform thickness, with the exception of its differentiated cross section, the thickness of the first part being identical to the thickness of the second part.

4. The envelope of claim 2, wherein each envelope part has a thickness which is greater from a transition point to a point immediately prior to the differentiated cross section of the respective flap, where each transition point is located on the sidewall of the respective part in a position next to the respective shoulder of the tread.

* * * * *